US007866607B2

(12) United States Patent
Benedict (10) Patent No.: US 7,866,607 B2
(45) Date of Patent: Jan. 11, 2011

(54) PIGGYBACK SATELLITE PAYLOAD ARRANGEMENT, A DEVICE FOR AND METHOD OF ATTACHING A PIGGYBACK SATELLITE PAYLOAD AND ADAPTER TO BE USED FOR A PIGGYBACK SATELLITE PAYLOAD ARRANGEMENT FOR LAUNCHING THE PIGGYBACK SATELLITE (75) Inventor: Bryan Benedict, Long Beach, CA (US)

(73) Assignee: Intelsat, Washington, DC (US)

( * ) Notice: Subject to any disclaimer, the term of this patent is extended or adjusted under 35 U.S.C. 154(b) by 102 days.

(21) Appl. No.: 11/797,008

(22) Filed: Apr. 30, 2007

(65) Prior Publication Data
US 2008/0149776 A1 Jun. 26, 2008

Related U.S. Application Data (60) Provisional application No. 60/876,146, filed on Dec. 21, 2006.

(51) Int. Cl.
*B64G 1/00* (2006.01)
(52) U.S. Cl. .............. 244/173.1; 244/173.3; 244/172.4; 244/173.2
(58) Field of Classification Search .............. 244/173.1, 244/173.2, 173.3, 172.4
See application file for complete search history.

(56) References Cited

U.S. PATENT DOCUMENTS

| 3,380,687 | A | * | 4/1968 | Ford et al. ................ 244/173.3 |
| 4,043,524 | A | * | 8/1977 | Dreyer et al. ............. 244/118.1 |
| 4,664,343 | A | * | 5/1987 | Lofts et al. ................ 244/171.1 |
| 4,896,848 | A | * | 1/1990 | Ballard et al. ............. 244/171.3 |
| 5,199,672 | A | * | 4/1993 | King et al. ................ 244/173.3 |
| 5,271,582 | A | | 12/1993 | Perkins et al. |
| 5,411,226 | A | * | 5/1995 | Jones et al. ............... 244/173.3 |
| 5,884,866 | A | * | 3/1999 | Steinmeyer et al. ...... 244/137.1 |
| 6,076,467 | A | * | 6/2000 | Cespedosa et al. .......... 102/378 |

(Continued)

FOREIGN PATENT DOCUMENTS

JP     2006-290065 A     10/2006

(Continued)

OTHER PUBLICATIONS

Orbital Sciences corporation, "Minotaur I User's Guide," Release 2.1, Jan. 2006 [Retrieved May 18, 2008] www.orbital.com/NewsInfolPublications/Minotaur_Guide.pdf p. 68-70.

(Continued)

*Primary Examiner*—Timothy D Collins
*Assistant Examiner*—Justin Benedik
(74) *Attorney, Agent, or Firm*—Sughrue Mion, PLLC (57) ABSTRACT The invention relates to a piggyback satellite, a device for and a method of attaching piggyback satellites with multiple payloads, including a primary satellite and at least one secondary payload, such as a deployable micro satellite, affixed instrument package or the like, wherein the secondary payload is mounted on the nadir end of the primary satellite, preferably employing a universal adapter between the primary satellite and the at least one secondary payload that releases at least one secondary payload or the like in a certain orbit in space for allowing the secondary payload to continue its journey independently in space for transmitting and receiving data.

3 Claims, 5 Drawing Sheets

U.S. PATENT DOCUMENTS

| | | | | |
|---|---|---|---|---|
| 6,138,951 | A * | 10/2000 | Budris et al. | 244/173.3 |
| 6,227,493 | B1 * | 5/2001 | Holemans | 244/173.1 |
| 6,244,541 | B1 * | 6/2001 | Hubert | 244/173.2 |
| 6,286,787 | B1 * | 9/2001 | Fleeter | 244/158.5 |
| 6,290,182 | B1 * | 9/2001 | Grunditz | 244/173.1 |
| 6,296,206 | B1 * | 10/2001 | Chamness et al. | 244/173.3 |
| 6,305,871 | B1 * | 10/2001 | Lancho Doncel et al. | 403/286 |
| 6,390,416 | B2 * | 5/2002 | Holemans | 244/173.3 |
| 6,416,018 | B2 * | 7/2002 | DiVerde et al. | 244/137.1 |
| 6,494,406 | B1 * | 12/2002 | Fukushima et al. | 244/173.3 |
| 6,494,407 | B2 * | 12/2002 | Arulf | 244/173.1 |
| 6,523,783 | B2 * | 2/2003 | Lounge et al. | 244/172.4 |
| 6,533,221 | B1 * | 3/2003 | Hubert | 244/173.1 |
| 6,588,707 | B1 * | 7/2003 | Hubert | 244/173.2 |
| 6,789,767 | B2 * | 9/2004 | Mueller et al. | 244/173.3 |
| 7,093,805 | B2 * | 8/2006 | Blackwell-Thompson et al. | 244/173.1 |
| 7,114,683 | B2 | 10/2006 | Hall | |
| 2002/0179775 | A1 * | 12/2002 | Turner | 244/158 R |
| 2002/0179776 | A1 * | 12/2002 | Mueller et al. | 244/158 R |
| 2005/0109878 | A1 * | 5/2005 | Cruijssen et al. | 244/158 R |

FOREIGN PATENT DOCUMENTS

| | | |
|---|---|---|
| WO | 92/00223 A1 | 1/1992 |
| WO | 2004-012995 A1 | 2/2004 |

OTHER PUBLICATIONS

Defence Advanced Research Projects Agency, Fact Sheet, DARPA, Mar. 2007, Orbital Express, pp. 1 and 2.

* cited by examiner

PIGGYBACK SATELLITE PAYLOAD ARRANGEMENT, A DEVICE FOR AND METHOD OF ATTACHING A PIGGYBACK SATELLITE PAYLOAD AND ADAPTER TO BE USED FOR A PIGGYBACK SATELLITE PAYLOAD ARRANGEMENT FOR LAUNCHING THE PIGGYBACK SATELLITE

This application claims priority from U.S. Provisional Application No. 60/876,146, filed on Dec. 21, 2006, the disclosure of which is incorporated herein by reference.

BACKGROUND OF THE INVENTION

1. Field of the Invention

The invention relates to a satellite, and a device for and a method of attaching a piggyback micro-satellite(s) payloads as a secondary payload. The deployable micro-satellite, is mounted on the nadir end of the primary satellite, preferably employing a universal adapter between the primary satellite and piggyback satellite (secondary payload).

2. Background of the Invention

In order to increase the number of payloads that can be flown with reduced costs, the concept of "hosted hardware" was developed, which infers that a parent spacecraft "host" is used as a platform on which the "hosted payload" can achieve access to space. The hosted payload may be a micro-satellite or a collection of sensors, electrical units and antenna. There are two primary ways to accomplish this task, integrating the payload into the parent satellite or integrating the payload onto the parent satellite. One approach to integrating the payload into the parent satellite involves "significant-integration," where the payload hardware is installed during the manufacturing of the primary/"parent" spacecraft. Units are mounted directly on internal equipment shelves and spacecraft subsystems are redesigned to accommodate the specific needs of the hosted hardware. An example of this approach is the GCCS FAA payload integrated on Intelsat's Galaxy 15 spacecraft manufactured at Orbital Sciences. The disadvantage of this approach is that the flight hardware must be available in time for the assembly and test of the parent spacecraft and the non-recurring costs are high due the spacecraft redesign which must be conducted. In addition, the hosted hardware is forced to ride on the parent satellite—utilizing the parent satellite bus for power, thermal control and orbital maintenance (attitude control (pointing), station keeping and momentum dumping).

The approach of mounting a hosted payload onto the parent spacecraft offers several advantages, including: little non-recurring work is required, hardware (such as a micro-satellite) can arrive later in the program, rework of the hosted payload is much easier and switch-out of one hosted payload for another is relatively simple. To this end, several standardized Multiple Payload Adapters (MPA's) have been developed to attach to existing payload for taking advantage of the excess payload capability on launch systems.

One such approach to mounting multiple small payloads on an ASAP structure installed around the primary satellite adapter is disclosed in published patent application WO 2004/012995 A1. Another such approach developed in a cooperative venture of several U.S. government and private agencies, is the result of the ESPA (Evolved Expendable Launch Vehicle (EELV) Secondary Payload Adapter (ESPA)) program. A goal of the ESPA program is to increase the number of secondary payload launch opportunities available at a reasonable cost. Key to achieving this goal is the development of standardized adapters for launching small micro-satellites from a parent satellite, such as the ESPA adapter that can piggyback up to six secondary payloads onto a primary satellite and, thereby, take advantage of existing unused launch vehicles payload mass margin.

As explained at the Air Force Horizons Laboratory website (www.afrlhorizons.com), the ESPA adaptor is a 0.5 in. thick aluminum ring that is roughly 62 in. in diameter by 24 in. tall and can mount individual micro-satellites on one of six standardized secondary payload mounting locations found on the perimeter of the ring. The secondary payload satellites, mount radially on the ESPA adapter, are deployed from the launch vehicle at the appropriate time using a separation systems such as the Lightband, a low-shock system provided by Planetary Systems Corporation of Silver Springs, Md. Using ESPA, each secondary payload micro-satellite can have a maximum mass of 400 lbs and a dynamic envelope of 24 in.×24 in.×38 in. The ESPA adaptor is installed between the EELV payload attach fitting and the primary payload. The primary payload may have a mass of up to 15,000 lbs and requires substantial space under the fairing—since the ESPA ring is only 24 in. high, only a small amount of the total volume is taken away from the primary payload.

One of the problems with ESPA adapter ring, as disclosed in the above patent, is the weight tax of the ESPA ring itself, as the ring not only is required to carry the loads of the laterally-mounted secondary satellites (sometimes referred to as "microsats"), but also the mass of the parent or primary payload. Further, the launch penalty of the ESPA ring is not insignificant since it places extra debris into orbit. Finally, if an ESPA location is depopulated late in the program, a dummy mass model must often be flown to maintain originally-specified mass properties limitations (which is exactly what occurred on the March 2007 Atlas 5 STP mission).

Thus, there is a need to reduce the cost and increase the ease of integrating smaller secondary satellites to primary satellites (through the use of a standardized or universal adapter). Thus, it is an aspect of the present invention to overcome the problems and disadvantages of the prior art designs and methods.

It is yet another aspect of the present invention to provide a payload design that permits the use of a universal adapter for coupling together in an efficient and effective package at least one secondary payload to a primary satellite for launching the secondary payload in a certain orbit.

It is a further aspect of the present invention to provide an micro-adapter between the primary satellite and a secondary payload, which utilizes existing heritage hardware to couple and then separate the microsatellite from the parent satellite nadir-mounted micro-adaptor at the appropriate orbit.

SUMMARY OF THE INVENTION

In view of the above, it is an aspect of the present invention for attaching piggyback satellite payload using an adapter for attaching at least one secondary payload to the nadir end of a primary satellite of a spacecraft that secures the secondary payload during launch and then releases at least one secondary payload in a certain orbit.

An exemplary aspect of the present invention provides a piggyback micro-satellite arrangement including: a primary satellite having a nadir end; at least one secondary payload; and an adapter, wherein the secondary payload is affixed to the nadir end of the primary satellite by the adapter.

BRIEF DESCRIPTION OF THE DRAWINGS

The accompanying drawings, which are included to provide a further understanding of preferred exemplary embodiments of the present invention and are incorporated in and constitute a part of this specification, illustrate exemplary embodiments of the invention and together with the description serve to explain the principles of the drawings in which.

DETAILED DESCRIPTION OF THE
EXEMPLARY EMBODIMENTS OF THE
INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements.

Figure 1A:
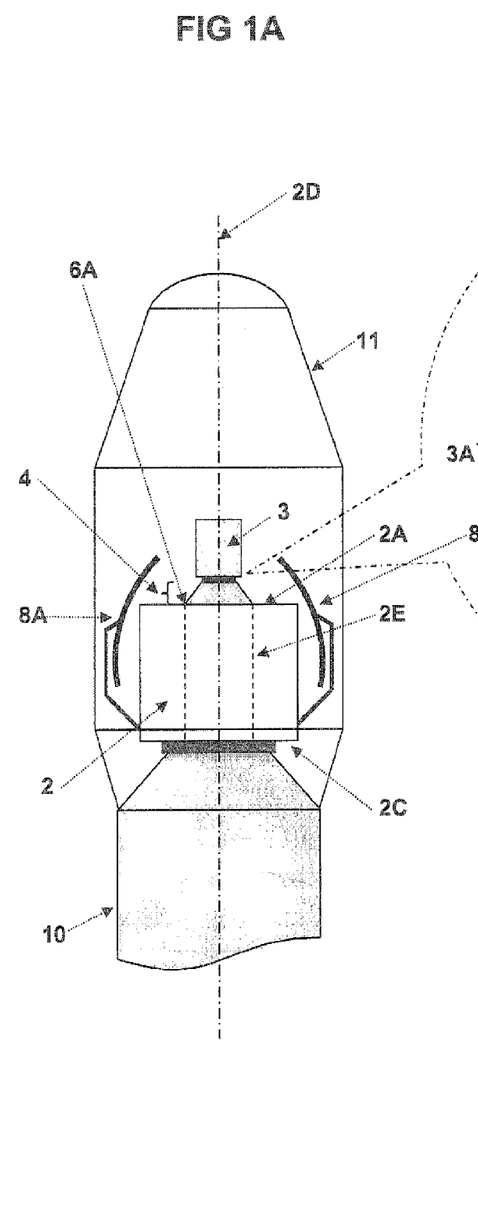
FIG. 1A is a schematic view of a piggyback satellite arrangement, including a spacecraft (primary payload), a piggyback micro-satellite (secondary payload), and adapter which includes a compatible adapter cone and a clamp band according to the invention.

An exemplary embodiment of a piggyback arrangement of a primary satellite and a secondary payload is illustrated in FIG. 1A. The figure illustrates a mated combination of a primary satellite 2 and a secondary payload 3, but the invention is not limited thereto, as will be apparent from the subsequent description of additional embodiments. In FIG. 1A, a launch vehicle 10, which typically is the upper stage of a multi-stage launch rocket and conventionally has a payload secured to its upper end, also has a releasable fairing 11 attached to its upper end to cover and protect the payload during launch. The payload, in accordance with an exemplary embodiment of the invention, is a piggyback arrangement of a primary satellite 2, and a secondary payload 3, where the secondary payload 3 is mounted to the nadir end 2A of the primary satellite 2. The primary satellite 2 has appropriate thrusters, engines or rockets (not shown) for maneuvering the primary satellite 2 into a desired orbit and maintaining the satellite in a desired orbit. The primary satellite at launch also may have deployable antennae 8A and 8B, deployable solar panels (shown stacked in launch configuration as "14" in FIG. 2) and a variety of control, and telemetry antennae 8C (FIGS. 2 and 3) and power system components (not shown), as would be known to one skilled in the art.

In the exemplary embodiment illustrated in FIG. 1A, the primary satellite 2 has an apogee platform 2C that is transverse to a longitudinal axis of symmetry 2D. The primary satellite typically is constructed with a cylindrical longitudinal support cylinder or core 2E that provides strength and stability to the satellite and supports the various components and systems that conventionally comprise a satellite design, including control, telemetry, communication and power subsystems. The core 2E is constructed of light weight but rigid materials that can withstand longitudinal compressive forces and stresses, and provide torsion stability, especially after antenna and solar panel deployment. Such design conveniently permits support of relatively large masses at the nadir end of the primary satellite. As would be understood, however, the present invention is not limited to such structure, and any alternative satellite design that permits support of a secondary payload mass at the nadir end of a primary satellite would be useable in implementing the principles of the present invention.

In the exemplary embodiment illustrated in FIG. 1A, the primary satellite 2 and the secondary payload 3 are coupled together by an adapter 4. The adapter 4 is mounted to the nadir end 2A of the primary satellite 2, supported directly or indirectly by the core 2E (also shown in FIG. 2) in the exemplary design, so that the stresses of the mass of the secondary payload 3 during launch and during separation after launch will be accommodated. The adaptor 4 may have any of a variety of designs that would permit convenient attachment to the nadir deck 2A of the primary satellite, and permit convenient attachment of a secondary payload 3 during piggyback payload assembly, and separation of the secondary payload 3 after launch, where the secondary payload is a micro satellite or similar smaller satellite payload.

Figure 1B:
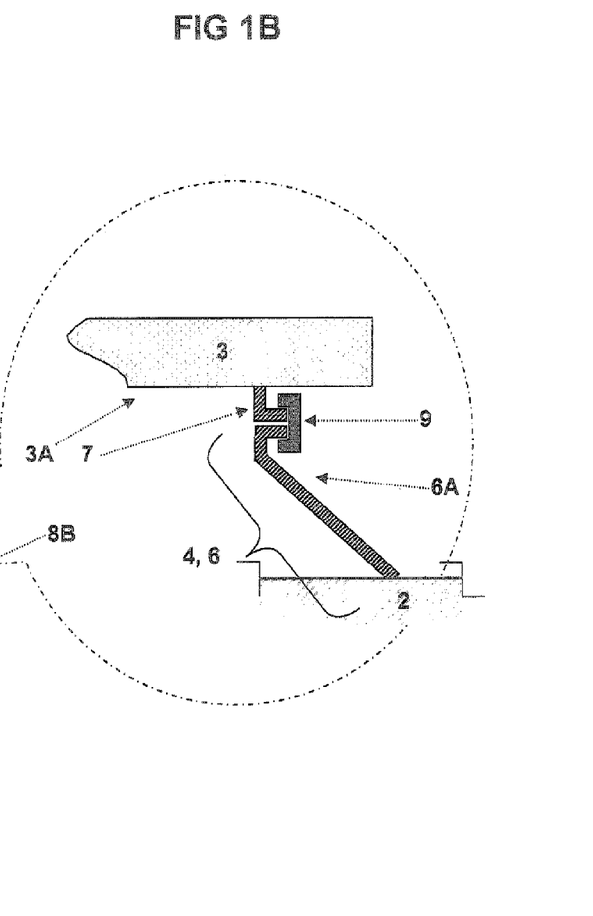
FIG. 1B is a schematic view of a an adaptor arrangement for clamping the secondary payload (in this case a micro-satellite) to the primary/parent satellite, including a clamp band coupling structure that clamps a first coupling structure to a second coupling structure.
Figure 2:
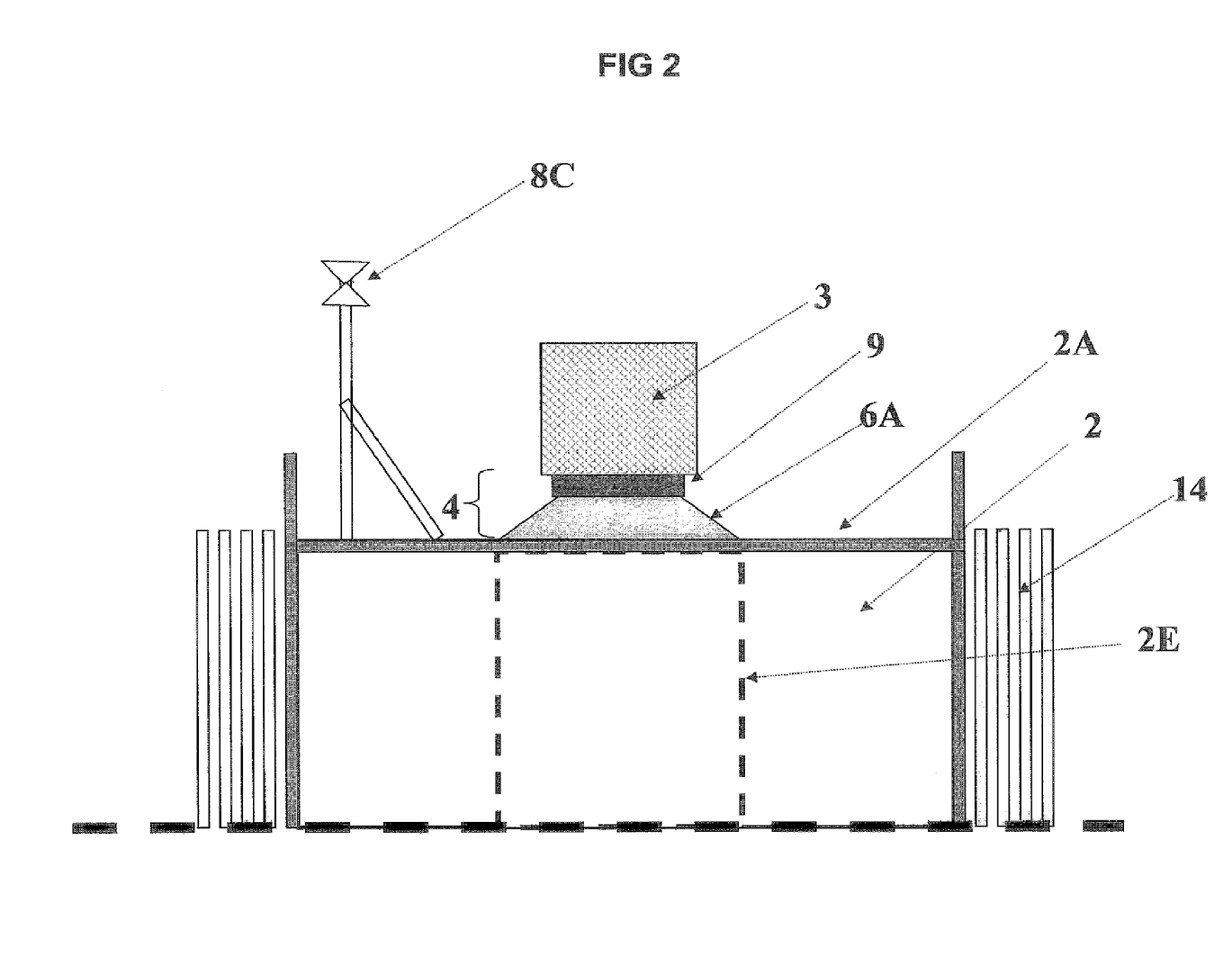
FIG. 2 is a schematic side view of a piggyback satellite arrangement (90 degrees perspective rotation from FIG. 1A), comprising a primary payload, a second payload, central support cylinder, an adapter cone, and a clamp band according to the invention.
Figure 3:
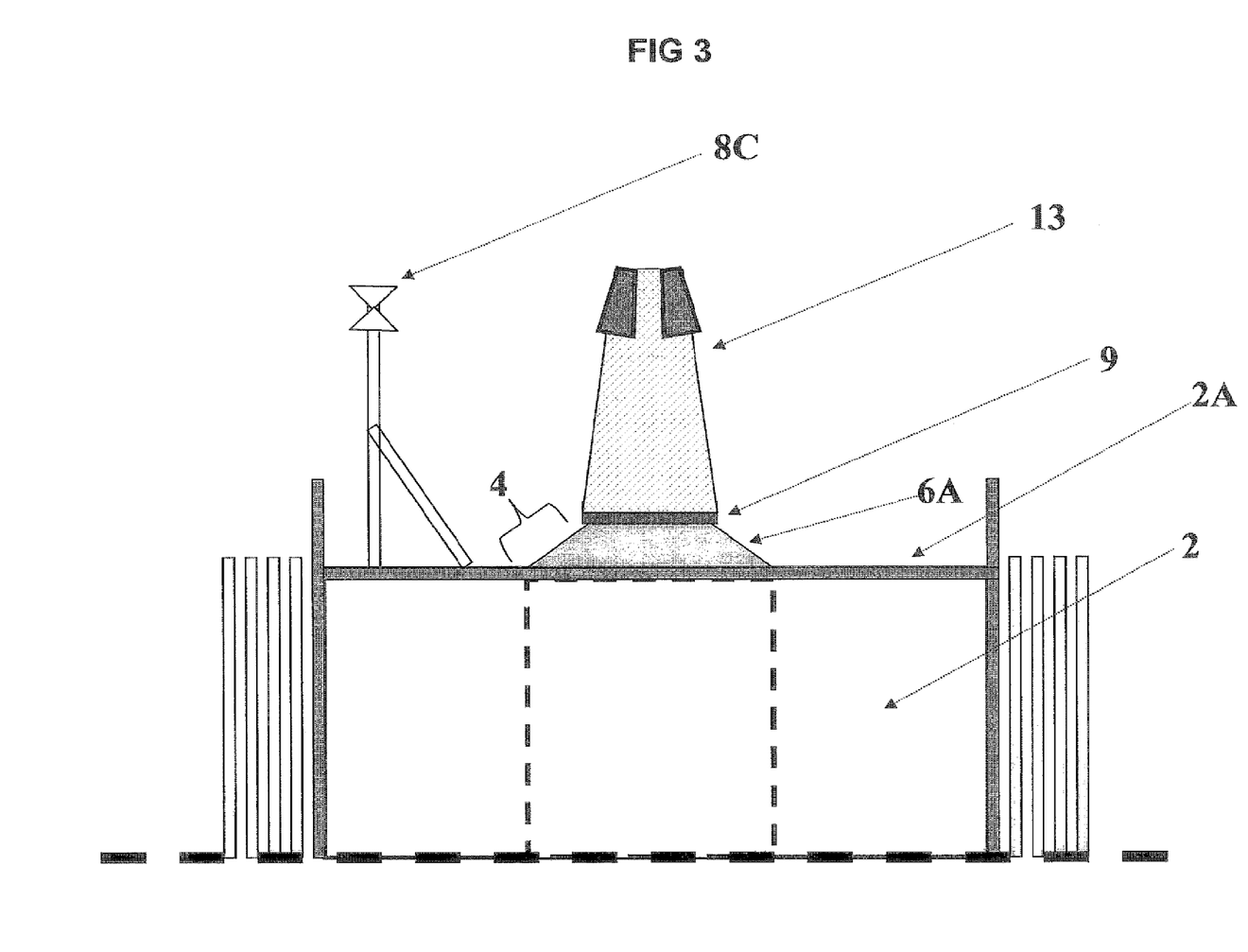
FIG. 3 is a schematic side view of the parent satellite and adaptor, where the standardized micro-satellite position on the adaptor has been replaced with an antenna tower (as may be required by the parent satellite when a secondary payload is not flown) according to the invention.

An exemplary embodiment of an adapter 4 is illustrated in FIG. 1B and includes a first coupling structure 6 that is attached to the primary satellite 2 and may be an ESPA compatible adapter cone, or the like, that is designed to readily couple to the nadir end 2A of the primary satellite and to absorb shock and stresses during launch. Preferably, as also illustrated in FIGS. 2 and 3, the base 6A of the cone is coupled over the cylindrical core 2E of the primary spacecraft, or otherwise supported by longitudinal structures that can absorb stress and shock stemming from the mass of the secondary package during launch and/or deployment. A second coupling structure 7 is attached to the apogee end 3A of the second payload 3, which may be a microsat or other secondary payload structure. A clamp band 9 provides a physical mechanical coupling and release mechanism between the secondary payload 3 and the top of the micro-adapter on the main payload nadir deck 2A. The clamp band 9 preferably is affixed over the interface of the first coupling structure 6 and the second coupling structure 7 for easy assembly of the piggy back payload. The clamp band 9 also may be readily released by remote control, so that a secondary payload satellite may be deployed in orbit, the secondary payload removed for repair or testing prior to launch, or an alternative secondary payload mounted to the primary satellite, if needed.

The adaptor 4 is a standalone mechanical system that, in an embodiment for a deployable secondary payload, consists largely of a clamp and multi-spring system. The first coupling structure and the second coupling structure are held together with clamps which can be released simultaneously through different mechanisms and the bodies are propelled apart by compressed springs. One type of clamp band is the Lightband satellite separation system, built by Planetary Systems Corporation. It is designed to allow, once initiated, for a secondary payload to be pushed away from a primary satellite via spring forces. Another type of clamp band system has clamps on an outer ring, held together by a tensioned wire or strap, wherein the clamps are released by cutting the wire or strap with a heating element or pyrotechnic device. Yet another type of clamp band system has clamps on an inner ring that are pulled back by their attachment to a retracting metal ring. Other systems are made by Saab Ericsson, Starsys and Mannon, and are operated pyrotechnically or mechanically. In each of these systems, following initiation, spring sets impart the required velocity to separate and, if required, spin the satellite.

For example, when a clamp band 9 is actuated for release when in orbit by command to the main satellite, the release allows small push-off springs to move the second payload away from the primary payload. Specifically, the clamp band 9 may pull away from the interface of the first coupling structure 6 and the second coupling structure 7, driven by a first set of springs (not shown), and then the second payload push-off springs (not shown) move the second payload away from the primary payload.

FIG. 1B illustrates the first coupling structure 6A that is commonly known as the adapter cone that attached to a EELV Secondary Payload Adapter ring, referred to as "ESPA," which was conceived to take advantage of anticipated excess launch capacity on many of the DOD (Department of Defense) and commercial launches of the new large expendable launch vehicles, currently being built by Lockheed Martin and the Boeing Company. This configuration allows the secondary payloads to be released before the primary payload, if necessary. As shown in FIGS. 1A, 2, and 3, the ESPA-compatible cone 6A is mounted to the central support structure of the primary satellite that is identical to EELV Standard Interface Plane (SIP). Where the SIP, is a 62.01-inch bolt circle for the mechanical interface as defined for all military EELV-Medium payloads that allows at least one secondary payload to attached the adapter cone to the primary satellite by means similar to the Standard Interface Plane of the ESPA ring. The ESPA adapter compatible cone is mounted to the nadir end of the primary satellite.

FIG. 3 illustrates that if the secondary payload/microsat is not flown, and if the payload system design of the primary spacecraft requires, at least one antenna tower 13 may be adapted to attach in place of the secondary payload on top of the micro-adaptor interface 6A. Based upon qualified structure mass margins for current satellites the acceptable secondary payload mass is 150 kg or below but mass margins on other vehicles may likely be larger. For examples, ESPA limitations are 181 kg for each secondary payload. Based upon the headroom to the launch vehicle dynamic fairing envelope some vehicles may be able to accommodate secondary payloads geometrically larger than allowed on the ESPA (where the current maximum size is 24×24×38 inches).

Communications to/from the second payload prior to separation are typically through the communication capabilities of the primary spacecraft for efficiency and cost savings, although the secondary payload may have its own communications capability if desired. Where there is communication across the primary to secondary payload interface, there would be wires extending across the interface via detachable connectors. Wires from the connectors go to the applicable units on the main spacecraft. For example, telemetry from the second payload will be interleaved into the main spacecraft telemetry frames i.e., from the perspective of the primary satellite the second payload will just look like another "box/unit" on the main spacecraft. Commands to the second payload will also be treated by the primary satellite as another primary satellite "box/unit". It is also possible to interface to the second payload through the main spacecraft databus. Once again the second payload will be interfaced by the main satellite as if it were just a part of the main spacecraft.

Both the primary satellite and the second payload will have an onboard battery for energy storage. In addition, the secondary payload can be powered either by taping into the primary satellite (through an electrical connector) or through umbilical to the ground. Umbilical power and communications connections between the secondary payload and primary satellite runs through one or more connectors which demate when the second payload moves away from the primary payload.

After launch and prior to the second payload being released, the second payload will continue to send housekeeping (health status) telemetry to the primary satellite through the electrical connector. The second payload health telemetry will be interleaved with the primary satellite telemetry through appropriate selection of primary satellite telemetry format. Following launch, communication is continued for verifying that the second payload batteries are sufficiently charged (in preparation for release of secondary payload) and that the second payload ACS (attitude control system) subsystem is ready to begin it's post-release command sequence (which may involves some sort of second payload attitude recovery and turn-on of second payload transmitters).

As a result, the second payload receives its own system test prior to mating with the primary payload. The stand-alone second payload system test will include a battery of system tests which are run both before and after exposure of the second payload to various environments (i.e. thermal vacuum, sine vibration, acoustics, shock, etc).

In an optimum situation, the second payload is mated to the main spacecraft and verified operational both before and after main spacecraft mechanical environmental testing (sine vibe/acoustics/shock). It may be beneficial to take the second payload into spacecraft thermal vacuum test with the primary satellite but it would likely not be a requirement. A deployment test of the second payload would be conducted at the conclusion of the mechanical testing and prior to shipping to launch site.

The mated piggyback spacecraft pair is then shipped to the launch site and retested both before and after mating to the launch vehicle upper stage. Since the testing of the second payload would be electronically through the primary payload, a new set of test procedures would be executed during the nominal main spacecraft checkout. Recall that from the point of view of the main spacecraft the second payload is treated like any other unit on the primary spacecraft. If the second payload requires loading of hypergolic propellants, the final checkout would not occur until that process was completed. The primary satellite and second payload would be fueled by the same team with propellants drawn from the same sources.

On the launch pad the health status of both the primary satellite and secondary payload are continuously monitored until the final "go for launch" is given. During ascent it may not be possible to obtain spacecraft telemetry due to the fact that the RF path may not be adequate (usually because the spacecraft telemetry output is not able to be received). During ascent on the launch vehicle (orbit raising) the spacecraft telemetry may be able to be received although it is not required. At some point in the orbit raising sequence, sometimes following separation of the primary satellite from the upper stage of the launch vehicle, spacecraft telemetry is restored in an event known as "acquisition of signal" which requires a healthy spacecraft in the correct configuration within visibility of a correctly-configured ground station. In general, acquisition of signal occurs either just before of just after separation from the launch vehicle (assuming a global network of ground stations).

Provided that the second payload survives launch, the primary satellite relays the second payload health status telemetry until the second payload release is executed. The drop-off point of the second payload is a certain point in the mission which may be before or after separation of the primary satellite from the upper stage of the launch vehicle. Regardless of health status, the second payload is released so that the primary satellite can complete its mission. Timing for separation of the second payload is in the control of the primary payload. This release will be commanded from the ground, or (if satellite command capability is unavailable) the second payload separation could also be executed by a timer or logic sequence.

Figure 5:
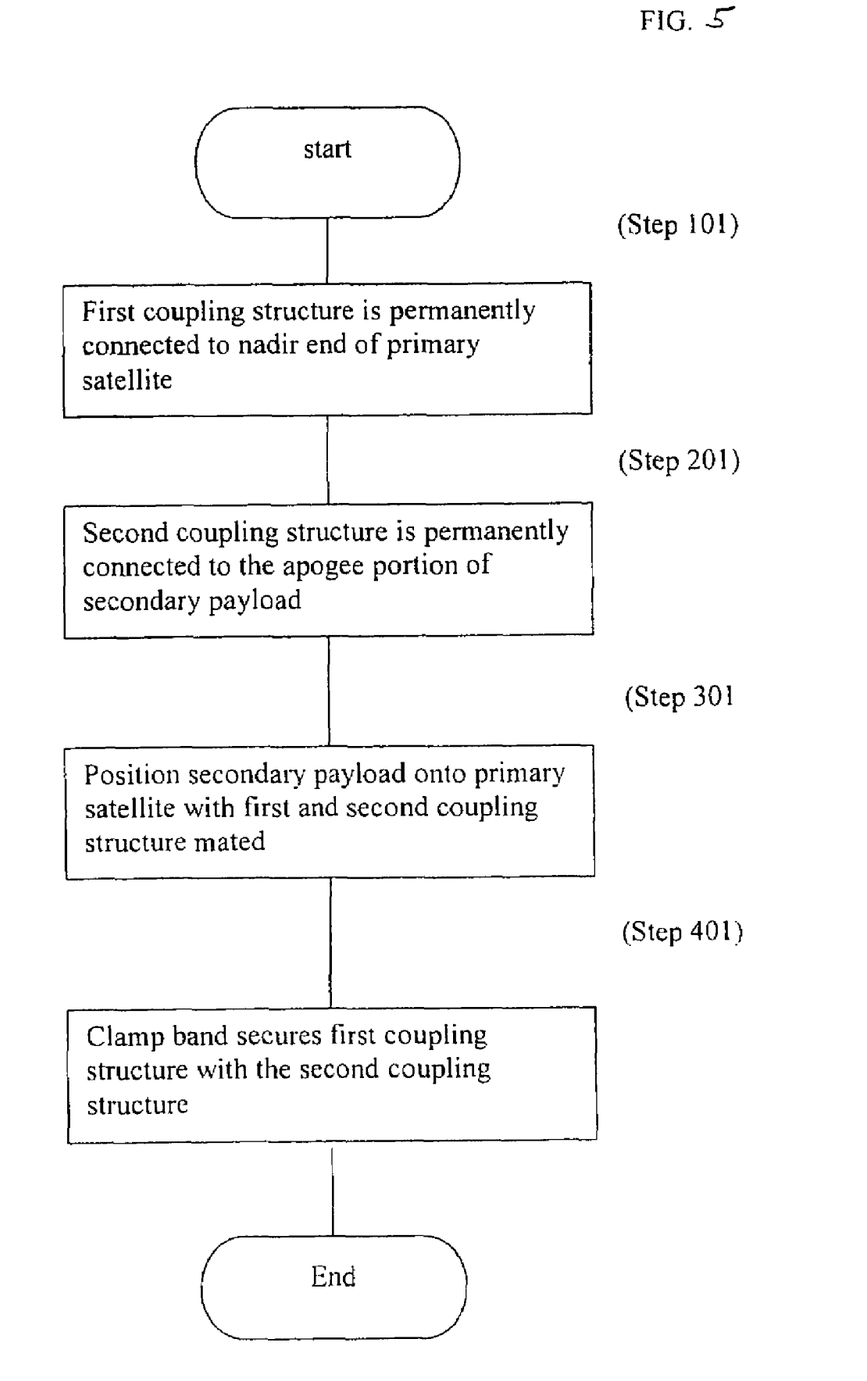
FIG. 5 is a flow chart illustrating the method of attaching piggyback satellite payload.

The assembly of the piggyback satellite will be described by a flow chart illustrated in FIG. 5.

First, a first coupling structure 6 is secured and permanently connected with the nadir end of the primary satellite by means of bolts or the like (step 101). Next, a second coupling structure 7 is secured and permanently connected to the apogee portion of the second payload by means of bolts or the like (step 201). Prior to coupling together the first coupling structure with the second coupling structure to form the adapter 4, the first coupling structure of the adapter 4 is mounted to the primary satellite 2. Either at the same time, or before or afterward of the attachment of the first coupling structure 6 of the adapter 4 is placed on the primary satellite 2, the second coupling structure 7 of the adapter 4 together with the second payload 3 is placed on the first coupling structure 6 of the adapter 4 in order to position the secondary payload onto primary satellite with the first and second coupling structure mated (step 301). After that, the second coupling structure 7 of the adapter 4 is clamped by the clamp band 9 to the first coupling structure of the adapter 4 in order to bring the same into the ready and pre-launch/permanent form (step 401) (as shown in FIGS. 1A, 1B, 2, and 3). Securing and releasing of the second coupling structure 7 from the first coupling structure 6 occurs by means of the clamp band 9 (FIG. 1B) or other means known to the person skilled in the art. It is the intention that the securing between of the first coupling structure 6 and the second coupling structure 7 of the adapter 4 is to remain intact during launch until the second coupling structure 7 that is attached to apogee portion 3A of the second payload 3 is released from the first coupling structure 6 in a certain orbit.

Figure 4:
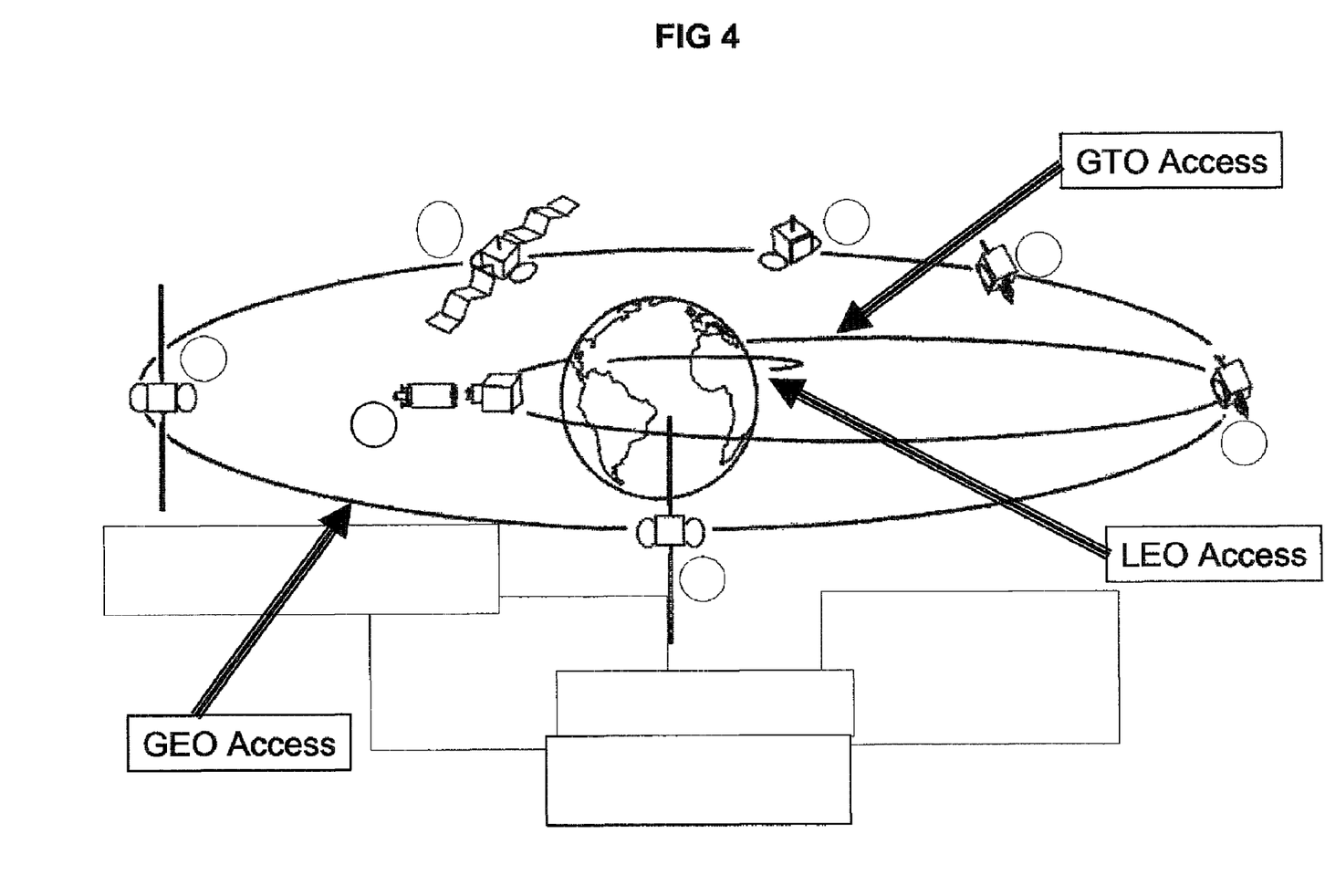
FIG. 4 is an illustration of various orbits where a microsatellite may be separated from the parent satellite along the path of the parent's orbit-raising mission to its final on-station position.

FIG. 4 illustrates orbits into which the secondary payload may be released in order to fulfill a launch mission. The orbit chosen for a satellite is a compromise between the mission requirements, the capabilities of the rocket used to launch the satellite & orbital mechanics. FIG. 5 illustrates typical launches of satellites that are made to the various orbits such as LEO, GTO, or GEO. The low Earth orbit (LEO) is generally defined as an orbit within the locus extending from the Earth's surface up to an altitude of 2,000 km. Given the rapid orbital decay of objects below approximately 200 km, the commonly accepted definition for LEO is between 200-2000 km (124-1240 miles) above the Earth's surface. Objects in LEO may encounter atmospheric drag in the form of gases in the thermosphere (approximately 80-500 km up) or exosphere (approximately 500 km and up), depending on orbit height. LEO is an orbit around Earth between the atmosphere and below the inner Van Allen radiation belt.

Equatorial Low Earth Orbits (ELEO) are a subset of LEO. These orbits, with low inclination to the Equator, allow rapid revisit times and have the lowest delta-v requirement of any orbit. Orbits with a high inclination angle are usually called polar orbits. Note that placement of secondary payloads (such as microsats) into inclined orbits can be accomplished by either release from rockets launched from facilities at latitudes separated from the equator or by use of thruster engines once in orbit to increase the north/south inclination.

Placement of secondary payloads into other orbits such as medium Earth orbit (MEO), sometimes called intermediate circular orbit (ICO), and further above, Geostationary orbit (GEO) are also possible.

Many micro-satellites are placed in various LEO orbits. In one LEO case they travel at about 27,400 km/h (8 km/s), making one complete revolution around the Earth in about 90 minutes (similar to the Space Shuttle). The primary exceptions are communication satellites which require geostationary orbit, and which move at the same angular velocity as the Earth rotates. However, it requires less energy to place a satellite into a LEO and the LEO satellite needs less powerful amplifiers for successful transmission, so LEO is still used for many communication applications. Because these LEO orbits are not geostationary, a network (or "constellation") of satellites is required to provide continuous coverage.

GEO is geosynchronous orbit which is a geocentric orbit that has the same orbital period as the sidereal rotation period of the Earth. It has a semi-major axis of 42,164 km (26,200 miles). In the special case of the geostationary orbit, an observer on the ground would not perceive the satellite as moving and would see the satellite at a fixed point in the sky. Such orbits are useful for telecommunications relays. In the more general case, when the orbit has some inclination and/or eccentricity, the satellite would appear to describe a more or less distorted figure-eight in the sky, and would rest above the same spots of the Earth's surface once per sidereal day.

A launch vehicle can move from LEO to GTO (illustrated in FIG. 4) by firing a rocket at a tangent to the LEO to increase its velocity. Typically the upper stage of the vehicle has this function. Once in the GTO, it is usually the satellite itself that performs the conversion to geostationary orbit by firing a rocket at a tangent to the GTO at the apogee. Therefore the capacity of a rocket which can launch various satellites is often quoted in terms of separated spacecraft mass to GTO rather than ditto to GEO. Alternatively the rocket may have the option to perform the boost for insertion into GEO itself. This saves the satellite's fuel, but considerably reduces the separated spacecraft mass capacity.

Thus, during the nominal launch mission, there are several occasions where a secondary payload can be conveniently released. For example, a secondary payload desiring a highly-inclined orbit, release from a Baikonur launch would allow inclinations up to 50 degrees. Further, those microsatellites desiring a lower inclination could be release from a Sea-Launch at about 0 degrees of inclination.

It will be apparent to those skilled in the art that various modifications and variations can be made to the described preferred exemplary embodiments of the present invention without departing from the spirit or scope of the invention where in the present invention, the secondary payload is likely to be mounted on the nadir of the parent spacecraft. As a result launch loads are significantly-better accommodated than through the laterally-mounted ESPA interface. In addition, shock attenuation through the parent spacecraft will provide a less-severe environment than ESPA.

Also, it will be apparent to those skilled in the art that various modifications and variations can be made to the described preferred exemplary embodiments of the present invention without departing from the spirit or scope of the invention. Thus, it is intended that the present invention cover all modifications and variations of this invention consistent with the scope of the appended claims and their equivalents.

What is claimed is:

1. A method of assembling and deploying at least two satellites arranged in a piggyback configuration with a launch vehicle, the method comprising:

providing a primary satellite having a nadir end and an apogee end, said satellite being equipped with deployable telecommunications antennae, deployable solar panels and a primary satellite propulsion system operative to lift the primary satellite into geostationary orbit after separation from the launch vehicle, and being further equipped with an adaptor to mate to a secondary micro-satellite;

providing at least one secondary micro-satellite having a nadir end and an apogee end;

affixing at least one secondary micro-satellite at its apogee end to the nadir end of the primary satellite using the adapter, wherein the adapter further comprises a first coupling structure and a second coupling structure, the first coupling structure being disposed on the nadir end of the primary satellite and positioned for support by the primary satellite support structure, and the second coupling structure is disposed on an apogee end portion of the secondary micro-satellite, securing the first coupling structure to the second coupling structure prior to launch to form a combined payload package comprising the primary satellite and the at least one secondary micro-satellite, launching the combined payload package with the launch vehicle, releasing the combined payload package from the launch vehicle along an orbit raising path for the primary satellite and operating the propulsion system to lift the primary satellite into geostationary orbit after separation from the launch vehicle; and controllably activating the adaptor for releasing the secondary micro-satellite along the parent's orbit-raising secondary micro-satellite along said primary satellite's orbit-raising path up to and including geostationary orbit (GEO) after launch, whereby the primary satellite serves as an upper stage for launch of said secondary micro-satellite and places the secondary micro-satellite into orbit without releasing any debris.

2. The method of assembling and deploying a piggy back satellite as recited in claim 1 further comprising:

integrating connectivity, both mechanical and electrical, between the primary satellite and the secondary micro-satellite by at least providing power to the secondary satellite from the primary satellite via an interface in the adapter; and providing telemetry and/or command communication between the secondary satellite and the primary satellite via an interface in the adapter.

3. The method of assembling and deploying a piggyback satellite as in claim 1, further comprising affixing a plurality of additional payloads onto the adapter, comprising at least one of an instrument package, equipment panel, and antenna system, whereby said combined payload package includes said additional payloads.

* * * * *